United States Patent Office 2,716,401
Patented Aug. 30, 1955

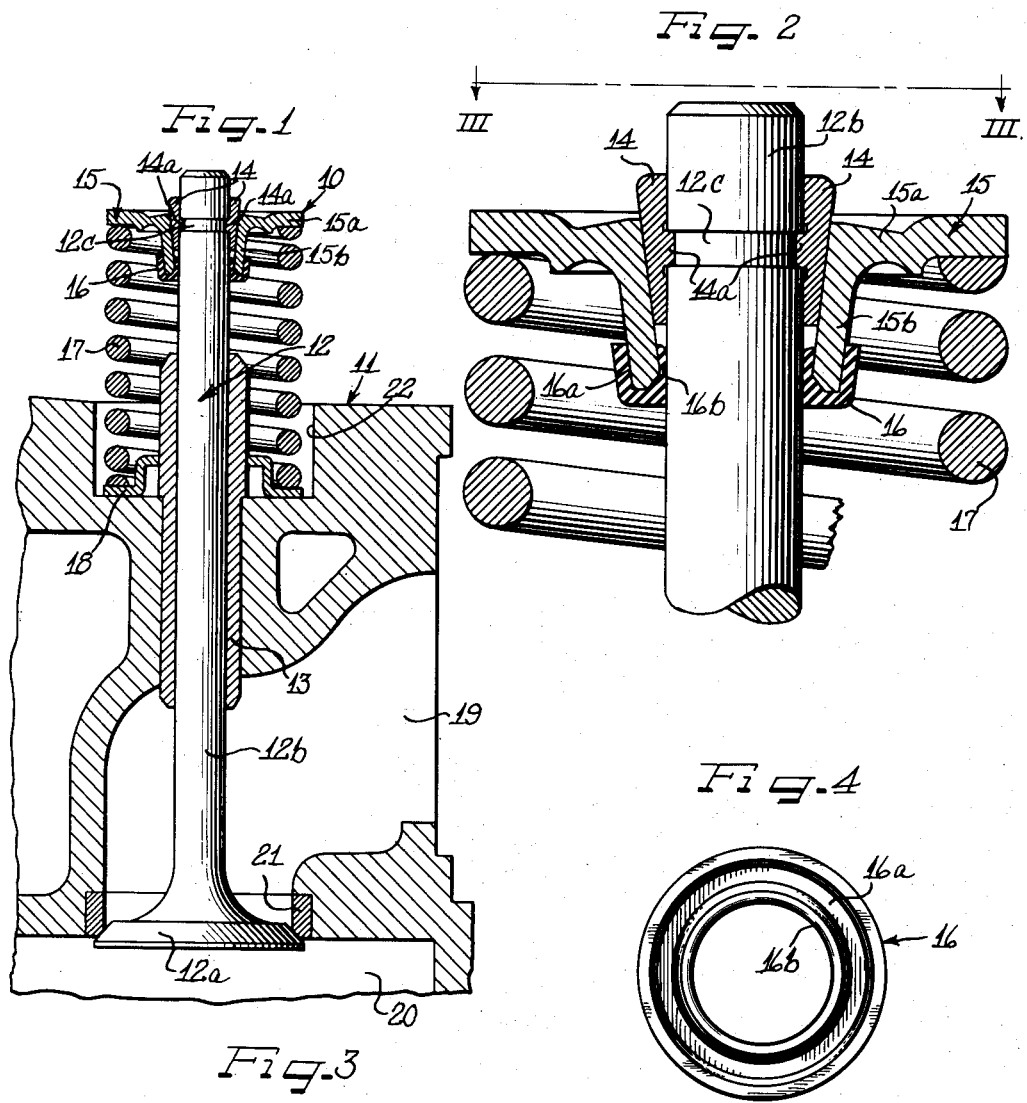

2,716,401

OIL SEAL FOR VALVE ASSEMBLY

Herbert E. Sietman, Bay Village, Ohio, assignor to Thompson Products, Inc., Cleveland, Ohio, a corporation of Ohio Application January 16, 1952, Serial No. 266,658

6 Claims. (Cl. 123—188)

This invention relates to a device for controlling lubrication of a valve stem. Specifically, this invention deals with an oil seal for a valve spring retainer cap.

It has been found that excessive flow of oil onto the projecting stem portion of an internal combustion engine poppet valve will result from rocker arm lubrication and the like lubrication of the projecting parts of overhead valves unless flow of oil along the valve stem is controlled. This invention prevents excessive oil flow along the valve stem by equipping the valve spring retainer cap with a pliable seal having an interference fit with the valve stem. The seal conveniently takes the form of an annularly grooved nose-piece or ring vulcanized or otherwise affixed to the end of the conical head portion of the retainer cap. The seal is preferably composed of a pliable oil and heat resistant plastic, such as "neoprene," "Hycar," and the like.

It is, then, an object of this invention to provide an oil seal for a valve spring retainer cap to control flow of oil along a valve stem.

A further object of this invention is to provide a pliable oil seal for forming an interference fit on a valve stem to prevent flow of oil through the valve spring retainer cap.

A still further object of this invention is to provide an oil-resistant plastic seal for the conical head of a valve spring retainer cap to prevent flow of oil through the cap.

Other and further objects of this invention will be apparent to those skilled in the art from the following detailed description of the annexed sheet of drawings, which, by way of a preferred example only, illustrates one embodiment of the invention.

On the drawings:

Figure 1 is a fragmentary vertical cross-sectional view, with parts in elevation, of a poppet valve assembly of an internal combustion engine equipped with a valve spring retainer cap having the oil seal of this invention thereon.

Figure 2 is an enlarged vertical cross-sectional view, with a part in elevation, of a portion of the assembly of Figure 1.

Figure 3 is a plan view taken generally along the line III—III of Figure 2.

Figure 4 is a plan view of the hollow side of the valve spring retainer cap oil seal of this invention.

As shown on the drawings:

In Figure 1, the reference numeral 10 designates generally a poppet valve assembly operatively mounted on the head 11 of an internal combustion engine. The assembly 10 includes a poppet valve 12 with a head 12a and an elongated stem 12b, a valve stem guide 13 carried by the engine head 11, a pair of retainer locks 14, a valve spring retainer cap 15, the oil seal 16 of this invention, a valve spring 17, and a bottoming cap 18 for the valve spring 17.

The engine head 11 has a port 19 joined with the combustion chamber portion 20 thereof through a valve seat 21 controlled by the valve head 12a.

The top portion of the engine head 11 has a recess 22 therein receiving the cap 18, the lower portion of the spring 17, and the upper portion of the guide 13.

The tip end of the valve stem 12b has an annular groove 12c therearound in closely spaced relation from the end. The valve spring retainer locks 14 are segmental frusto-conical members with beads 14a around their inner faces for seating in the groove 12c. As shown in Figure 3, the retainer locks 14 each embrace less than half of the circumference of the valve stem 12b so that gaps 14b are provided between the locks.

The valve spring retainer cap 15 has a flat radially projecting disk portion or flange 15a and a depending hollow frusto-conical head portion 15b receiving the locks 14a in the upper part thereof. The head 15b projects beyond the lower ends of the locks and receives the seal 16 of this invention around the bottom end thereof.

As best shown in Figure 2, the seal 16 is in the form of an annulus with an annular groove 16a sized for snugly receiving the lower end portion of the retainer head 15b. The seal is composed of a heat and oil-resistant pliable plastic material and is cemented, vulcanized, or otherwise bonded to the conical head 15b. The inner face of the head 15b is thereby lined with a deformable insert. When seated on the head 15b, as shown in Figure 2, the head lining or inner wall 16b of the seal has an interference fit with the stem 12b of the valve to snugly embrace the stem and prevent leakage along the stem through the gaps 14b of the locks 14. The interference fit does not, however, interfere with action of the locks in maintaining a full locked relationship between the cap 15 and the valve stem 12b.

Oil from overhead valve actuating rocker arms or the like parts (not shown) cannot flow through the retainer cap along the valve stem and into the guide 13 to enter the port 19 and be wasted. Excessive lubrication of the valve stem guide 13 will be prevented and heretofore encountered carbonization of the valve stem by excessive oil will be avoided. Sufficient oil to lubricate the stem will be splashed around the projecting part of the valve stem during normal operation of the engine.

From the above descriptions it will therefore be understood that this invention provides an oil seal for a valve spring retainer cap to prevent excess flow of oil along a valve stem.

It will be understood that modifications and variations may be effected without departing from the scope of the novel concepts of the present invention.

I claim as my invention:

1. In a valve assembly, a valve spring retainer cap having an open ended hollow head portion for embracing a valve stem and a pliable nose mounted on one end of said head and receiving said end therein, said nose forming a deformable liner in said end of the head to sealingly engage a valve stem extending into the head.

2. An oil seal for a valve assembly which comprises a pliable plastic ring having an annular groove in one face thereof adapted to receive the head of a valve spring retainer cap and providing a deformable liner wall for said head to have an interference fit with a valve stem in the cap.

3. An oil seal for a valve spring retainer cap which comprises a pliable plastic annulus with opposed faces, one of said faces having an annular groove therein adapted to receive the conical head of a valve spring retainer cap and a deformable inner wall on said annulus adapted to line the head of the valve spring retainer cap extending into the groove thereof and to have an interference fit with a valve stem in the cap.

4. In an engine valve assembly having a stemmed poppet valve, a valve guide, a valve spring retainer cap surrounding the valve stem, opposed retainer locks in the valve spring retainer cap embracing the valve stem, and a valve spring acting on the retainer cap to move the valve to closed position, the improvement which comprises a pliable plastic seal ring having an annular groove in one face thereof receiving an end of the valve spring retainer cap therein and providing a deformable liner wall for said cap in interference fitting relation with the valve stem in the cap.

5. In a valve assembly for an internal combustion engine and the like, which includes a stemmed valve, a valve guide slidably receiving the valve stem, a valve spring retainer cap having a hollow conical head portion, spaced opposed retainer locks on said stem in said hollow head portion and anchoring the cap onto the valve, and a spring acting on the valve spring retainer cap for urging the valve into closed position, the improvement of an oil seal for said retainer cap which comprises a pliable plastic annulus having an annular groove therein receiving the small end of the conical head of said valve spring retainer cap and providing a deformable liner for said small end of the conical head of said cap in interference fitting relation with the valve stem in the cap.

6. A valve spring retainer cap which comprises a disk having a central hollow axially extending frusto-conical head portion, and a pliable plastic liner secured to the small end of said frusto-conical head portion and extending inside said end to form a deformable seal in the head portion for engaging a valve stem extending into the head portion.

References Cited in the file of this patent

UNITED STATES PATENTS

| | | |
|---|---|---|
| 1,930,368 | Nelson | Oct. 10, 1933 |
| 2,124,702 | Jacoby | July 26, 1938 |
| 2,505,128 | MacPherson | Apr. 25, 1950 |
| 2,565,190 | Winkeljohn | Aug. 21, 1951 |

FOREIGN PATENTS

| | | |
|---|---|---|
| 668,335 | Great Britain | Mar. 12, 1952 |